United States Patent [19]
Friedman

[11] Patent Number: 5,499,294
[45] Date of Patent: Mar. 12, 1996

[54] DIGITAL CAMERA WITH APPARATUS FOR AUTHENTICATION OF IMAGES PRODUCED FROM AN IMAGE FILE

[75] Inventor: Gary L. Friedman, Encino, Calif.

[73] Assignee: The United States of America as represented by the Administrator of the National Aeronautics and Space Administration, Washington, D.C.

[21] Appl. No.: 449,472

[22] Filed: May 24, 1995

Related U.S. Application Data

[63] Continuation-in-part of Ser. No. 159,980, Nov. 24, 1993, abandoned.

[51] Int. Cl.$^6$ .......................... H04N 7/167; H04K 1/00; H04L 9/00
[52] U.S. Cl. .................. 380/10; 380/30; 380/18; 348/207; 348/441; 348/460; 348/469; 348/552
[58] Field of Search ................. 380/10, 30; 348/207, 348/441, 460, 469, 552

[56] References Cited

U.S. PATENT DOCUMENTS

| | | | |
|---|---|---|---|
| 4,453,074 | 6/1984 | Weinstein | 235/380 |
| 4,670,857 | 6/1987 | Rackman | 380/4 |
| 4,879,747 | 11/1989 | Leighton et al. | 380/23 |
| 5,005,200 | 4/1991 | Fischer | 380/30 |
| 5,027,401 | 6/1991 | Soltesz | 380/54 |
| 5,185,794 | 2/1993 | Thompson et al. | 380/17 |
| 5,321,749 | 6/1994 | Virga | 380/18 |

OTHER PUBLICATIONS

Whitfield Diffie, et al., "New Directions in Cryptography," IEEE Trans. on Information Theory., vol. IT–22, No. 6, pp. 644–654, Nov. 1976.

Taher Elgamal, "A Subexponential-Time Algorithm for Computing Discrete Logarithms over GF($p^2$)," IEEE Trans. on Information Theory, vol. IT–31, No. 4, pp. 473–481, Jul. 1985.

R. L. Rivest, et al., "A Method for Obtaining Digital Signatures and Public-Key Cryptosystems," Communications of the ACM, vol. 21, No. 2, pp. 120–126, Feb., 1978.

Dennis K. Branstad, "The Proposal for a U.S. Standard for Digital Signature Encoding," IEEE Spectrum, pp. 30, Aug. 1992.

Primary Examiner—Stephen C. Buczinski
Attorney, Agent, or Firm—John H. Kusmiss

[57] ABSTRACT

A digital camera equipped with a processor for authentication of images produced from an image file taken by the digital camera is provided. The digital camera processor has embedded therein a private key unique to it, and the camera housing has a public key that is so uniquely related to the private key that digital data encrypted with the private key may be decrypted using the public key. The digital camera processor comprises means for calculating a hash of the image file using a predetermined algorithm, and second means for encrypting the image hash with the private key, thereby producing a digital signature. The image file and the digital signature are stored in suitable recording means so they will be available together. Apparatus for authenticating the image file as being free of any alteration uses the public key for decrypting the digital signature, thereby deriving a secure image hash identical to the image hash produced by the digital camera and used to produce the digital signature. The authenticating apparatus calculates from the image file an image hash using the same algorithm as before. By comparing this last image hash with the secure image hash, authenticity of the image file is determined if they match. Other techniques to address time-honored methods of deception, such as attaching false captions or inducing forced perspectives, are included.

9 Claims, 3 Drawing Sheets

FIG. 4

RANGE: 15', 122', 125', 218',

DATE: AUG 04 1993
TIME: 18:24:32: GMT 8.0 LUX
3200 K

D = 12.3M
INDEX = 8902716 f/2.8
1/10,000 = S

GPS = N 34° 23.38'
W 117° 53.24'

S/N=183A03B72F4EA7B300A8276D3A2EB8074CBD6D6B429FF0128E6AB71229A6C54B8092B78567A824056E126B5B8977C3562EA5671....
67A824056E126B5B8977C3562EA56713BA90142BA84729C5AB634E1FF0129C67EA6B4352AA23197183B8345E09F7A710CD777EF629A7B0

DIGITAL CAMERA WITH APPARATUS FOR AUTHENTICATION OF IMAGES PRODUCED FROM AN IMAGE FILE

ORIGIN OF INVENTION

The invention described herein was made in the performance of work under a NASA contract, and is subject to the provisions of Public Law 96-517 (35 USC 202) in which the contractor has elected not to retain title.

This application is a continuation-in-part of application Ser. No. 08/159,980, filed Nov. 24, 1993, now abandoned.

TECHNICAL FIELD

The invention relates to the field of photography, and more particularly to a digital camera equipped with apparatus for enabling an image file produced by the camera to be authenticated.

BACKGROUND ART

Photographs have in general been regarded as mediums that "do not lie." However, the inherent trustworthiness of photographs have been compromised by the increasing sophistication and ease with which photographic images can be manipulated. This problem is particularly severe in the case of digital cameras which store a recorded image in digital memory, such as on magnetic tape or laser disc instead of photographic film. There the concept of an "original" image is no longer meaningful.

While a need for authenticating photographs exists today, the seriousness of the problem is not yet widely acknowledged. Consider, for example, that while a photograph can be readily altered to a limited extent, it can be authenticated only to some degree by comparing a positive print with its negative film recorded by a camera while inspecting the negative film for evidence of physical alteration. Authentication of an image recorded by a digital camera is more difficult because there is no physical "original" to compare or negative to examine; furthermore, the digital image file produced by these cameras (as well as other digitally recorded information such as audio and video files) can be easily manipulated using sophisticated computers which make such manipulation easy and, as techniques improve, more difficult to detect.

Today, most pictures that appear in newspapers and magazines have been altered to some degree, with the severity varying from the trivial (such as deliberately removing distracting background while cleaning up "noise") to the point of deliberate deception, such as substituting heads on people's bodies. As the power, flexibility and ubiquity of image-altering computers continues to increase, the notion that photographs "do not lie" will become less widely held.

BACKGROUND ON DIGITAL SIGNATURES

The concept of a digital "signature" is based upon recent encryption techniques called "public key encryption." [Whitfield Diffie and Martin E. Hellman, "*New Directions in Cryptography,*" IEEE Transactions on Information Theory, Vol. IT-22, No. 6, pp. 644–654, November, 1976; Taher Elgamal, "*A Subexponential-Time Algorithm for Computing Discrete Logarithms over GF($p^2$),*" IEEE Transactions on Information Theory, Vol. IT-31, No. 4, pp. 473–481, July 1985; and R. L. Rivest, A. Shamir and L. Adleman, "*A Method for Obtaining Digital Signatures and Public-Key Cryptosystems,*" Communications of the ACM, Vol. 21, No. 2, pp. 120–126, February, 1978]

Older encryption/decryption schemes require that both the Sender and receiver possess the same secret "key": the sender uses the key to transform the text message into ciphertext, and the receiver uses the same key to perform an inverse transformation on the ciphertext, revealing the original text message. If the correct key transforms the ciphertext into unreadable garbage, it is reasonable to conclude that either the wrong key is being used, the message has been altered, or the sender has been impersonated by someone ignorant of the fact that a key is required to encrypt so the receiver can decipher. The historic drawback to this secret key encryption scheme has been in the secure distribution of keys; disclosure of the key by the sender to the receiver must occur out-of-band, either transmitted via an expensive alternate path or at some prior time, such as when the sender and the receiver were in the same space at the same time.

Public-key encryption techniques differ in that they enable the recipient of a message to decrypt it using a public key that is different from the one used by the sender to encrypt it, but mathematically related to it. Public key encryption employs two different keys: a private key, which is held by the security conscious party sending the message, and a corresponding public key, which need not be kept secret. The public key is generated based upon the private key, making the pair unique to each other.

All public-key cryptography is based on the principle that it is easy to multiply two large prime numbers together, but extremely difficult (taking perhaps centuries using today's supercomputers) to work backwards and uncover the factors (public and private keys) that could have been used to generate the resulting product of the multiplication process.

The public-key scheme is illustrated in FIG. 1 and works as follows: to send a secret message that only the recipient can read, the recipient's public key would first be made known to the sender via any nonsecure medium, such as a letter, a telephone conversation, or a newspaper notice. Anyone wishing to send a secure message would encrypt the message using this public key and transmit it to the recipient. The recipient, having sole possession of the corresponding private key, is the only one able to decrypt the message. The need to transmit a secret key that both parties must possess beforehand is thus obviated. The tradeoff is that, although only the recipient can decrypt the message, anyone who intercepts the public key can send a message with anonymity.

The process described above can also be implemented "backwards" to great advantage. In a second scenario, it is the sender who maintains possession of the private key, and anyone who has the widely disseminated corresponding public key is able to decrypt the message encrypted using the private key. Although this procedure no longer performs the traditional function of encryption (which is to provide confidential communication between two parties), it does provide a way to insure that messages are not forged: only the private key could have produced a message that is decipherable by anyone having the corresponding public key.

The foregoing provides the foundation for the concept of digital signatures; encoding a smaller representation of the message to verify the integrity and source of the message, as will now be described with reference to FIG. 2. The sender of a message generates a unique digital signature by hashing the message using a regular algorithm and encrypting the message using a private key. There is a public key corresponding to the private key to enable decryption of the hashed message. The digital signature is transmitted along with the plain (unhashed and unencrypted) text message so that a recipient may decrypt the digital signature and thus authenticate the message by comparison of the decrypted hash and a hash of the plain text message transmitted with the signature. Any difference will readily show that the message has been altered or has been transmitted by a person other than the one possessing the private key, which is itself a digital code. Thus, as long as the private key remains private, only the private key holder can produce messages decipherable by anyone holding the public key. Furthermore, it is extremely difficult to "reverse-engineer" the encrypted message using the public key to ascertain the private key. Without knowledge of the private key, a digital "signature" cannot be forged.

Digital signatures thus build upon the public-key cryptographic technique and allow a recipient to not only authenticate the contents of a plain text message but also the identity of the sender without obscuring the original message. Digital signatures are produced by creating a hash of the original plain text message, and then encrypting the hash using the sender's private key, as shown in the top half of FIG. 2. The result is a second, smaller digital file referred to as a signature which accompanies the original plain text message as a separate block of data.

A "hash" is created by a mathematical function which maps values from a large domain into a smaller range. For example, a checksum is a simple kind of hash. A more complex example of a hash algorithm would involve dividing a binary file into a collection of, say, 16 kilobit pieces and performing a cumulative exclusive-OR function between successive pieces. That produces a simple 16 kilobit hash which is smaller than the original file yet is particularly unique to it. Many more complex and secure transformations are also possible. An advantageous characteristic of a hash is that changing a single bit in the original message input would produce a very different hash output if subjected to the same mathematical function. This advantage of a hash will become apparent in the use of a hash in the present invention. Another advantage is that reverse engineering a message so it will yield a given hash and also make sense to the reader is virtually impossible. Thus, a key to the present invention is that a unique encrypted digital signature can be created by encrypting the output of the hashing function using a sender's private key.

In the process of hashing a message to produce a digital signature, the original message is retained unaltered; only the message's hash is altered by encryption with a private key. This way the original file can be read by anyone, yet each recipient may authenticate the message by decrypting the message's unique digital signature using the public key. If the decrypted digital signature and hash of the message in question is created by the same mathematical function that matches, both the integrity of the message and the authenticity of the sender are assured.

DIGITAL CAMERAS

Standard digital cameras are filmless; they sense light and color via an electronic device, such as a charge coupled device commonly known as a CCD, and produce as an output a computer file which describes the image using data bits (1's and 0's) arranged in a meaningful, predefined format. Often this digital image file is first stored on a small mass-storage medium inside the camera itself, such as a magnetic floppy disc, or a magneto-optical disk commonly referred to as a compact disc (CD), for later transference to a digital system for image processing and/or display. Alternatively, the image file can be sent directly to a digital system via a transmission medium. Once inside the digital system, it then can be displayed and easily altered in any number of different ways.

There are several ways of lying with an image, some as old as photography itself. The primary methods are: attaching false captions to the published photograph, using false perspectives and distortions of a scene, and manipulating the appearance of objects or persons in the scene, such as by computer-assisted manipulation of pixels while the image is still stored in digital form. The present invention addresses techniques for thwarting attempts to lie with photographs using one or more of these ways of lying.

STATEMENT OF THE INVENTION

An object of the invention is to provide a solution to the problem of authenticating digital image files, where the image file may be, for example, a single still image from a digital camera, a sequence of images from a digital video camera or even digital holograms. Authentication in this sense means to establish as worthy of belief that the image file has not been altered after its digital signature has been created. The term "image file" is thus used herein to refer to the recorded file of a digital still camera, a digital video camera or a digital holographic camera.

In accordance with one aspect of the invention, a digital camera system is equipped with not only the means for providing an image file (either stored in an internal medium for later transmission or transmitted directly to a digital image processing system) but also means for first providing a hash of the image file or blocks of the file in the case of a very long image file, such as from a video camera and means for then encrypting the hash with a unique private key embedded in the digital camera system. The private key is not known by anyone except perhaps the manufacturer of the digital camera system, or the encrypting means implemented, for example, as a programmed microprocessor embedded in the digital camera system. All that the user need know is a public key unique to the digital camera system. The encrypted hash is stored as a digital signature along with the image file and public key for later authentication.

For authentication of the image file, means for hashing the image file in question produces a checking hash, and means for decrypting the digital signature using the public key reveals the true hash produced by the digital camera system from the true, plain text image file and means for comparing the checking hash with the true hash. If the two hashes match, it is certain that the image file is authentic, i.e., that the image file has not been altered.

To further enhance the authenticatableness of an image from a digital camera system, information is added in a border of the digital camera image frame, such as the public key which is a unique serial number identifying the camera, the date, time, light level, color temperature, f/stop, shutter speed, latitude and longitude of the camera position, the camera pointing direction, focusing distance of the camera lens system and range (distance) from the camera of prominent objects in the image. All of the added information that is recorded in the border of the image frame is hashed and encrypted together with the image to become part of the signature. That information cannot be altered in the original image file containing this information without it being detected by later comparing the original image file hash with secure image hash of the original image file obtained from the digital signature by decrypting the digital signature with a public key that is mathematically related to the private key. Any alteration of the original image file transmitted with the digital signature, including the information entered on the border of an image file, will result in a mismatch of the two hashes compared. Only if there is not a mismatch will the original image file be declared authentic, and as an additional benefit the source of the image file will be declared as "authentic" since only a source having the private key mathematically related to the public key can produce and send a digital signature that contains a matching hash of the image file hash.

The range information of prominent objects in the digital image scene provides authenticatable data about the scene to an investigator which helps in the identification of inconsistencies in the image as well as in any image caption added to a published photograph or video scene. It also helps prevent use of an altered image that is projected at lifesize proportions and then photographed again with the original camera system at a distance similar to that image's content would suggest for then all objects in the photograph would be recorded as being at virtually the same range since all points in the projected image would be virtually the same as at the center of the projected image

BRIEF DESCRIPTION OF THE DRAWINGS

FIG. 3c is a block diagram of a system for authenticating the file image from the digital camera of FIG. 3a.

FIG. 4 illustrates a colored border of an image from a digital camera.

DETAILED DESCRIPTION OF THE INVENTION

Figure 1:
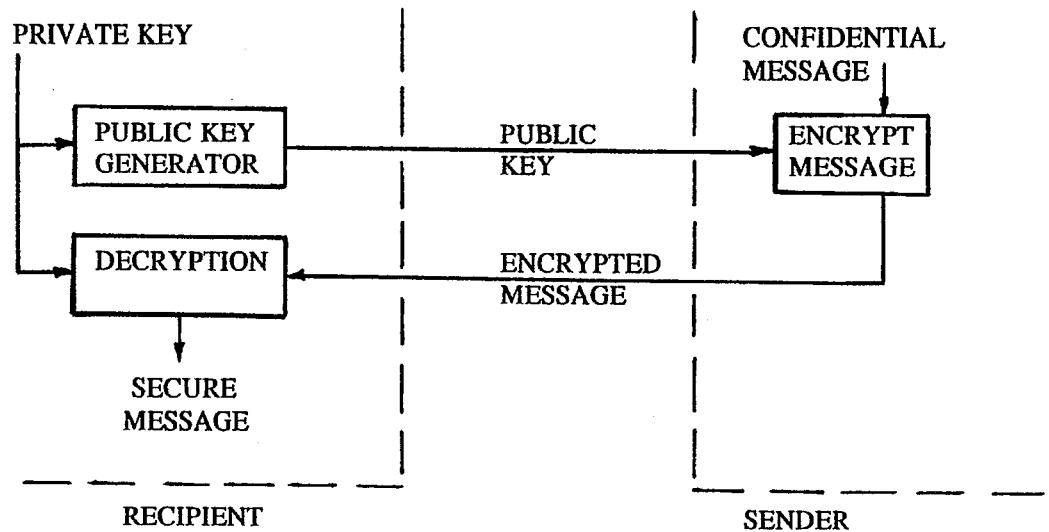
FIG. 1 is a block diagram illustrating public key encryption.
Figure 2:
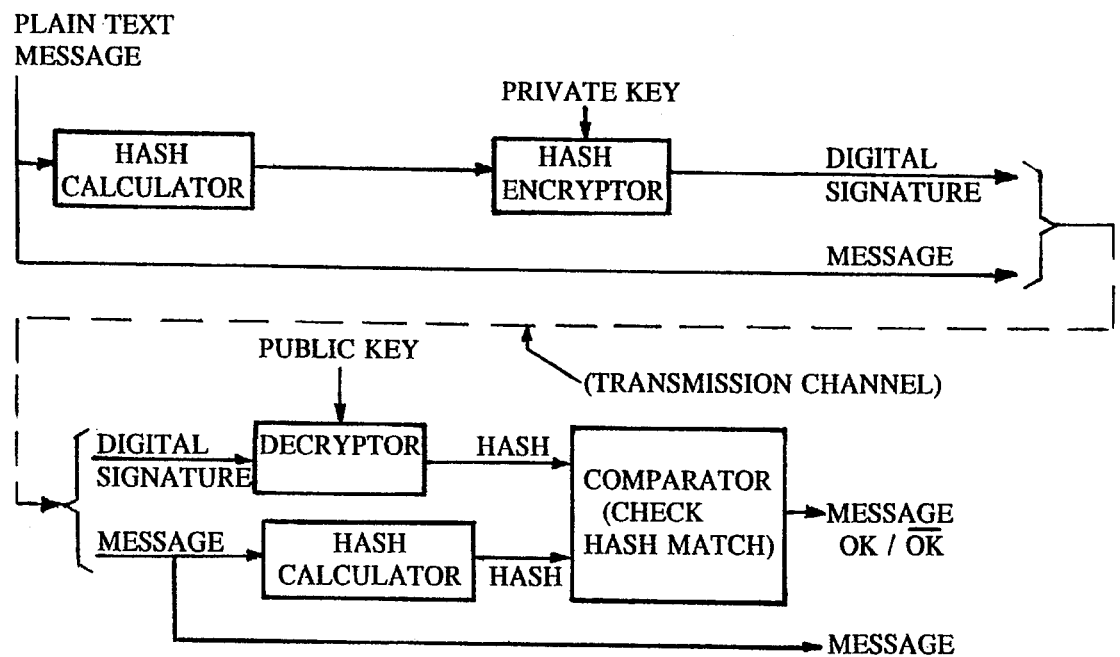
FIG. 2 is a block diagram illustrating the method of producing and using a digital signature.
Figure 3A:
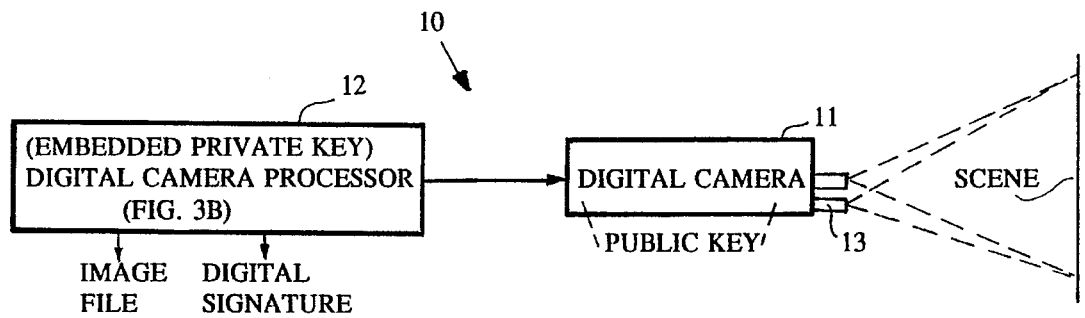
FIG. 3a illustrates a preferred application of the present invention to digital cameras.
Figure 3B:
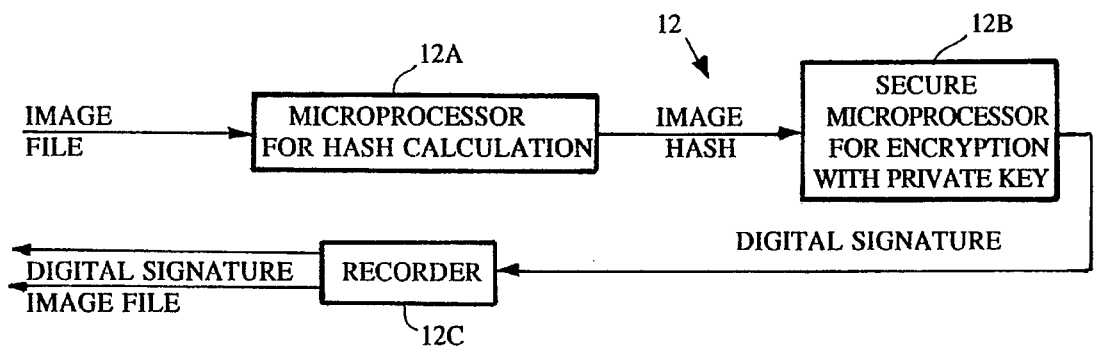
FIG. 3b is a block diagram of the present invention as applied to digital cameras for producing a file image with a digital signature to allow authentication of the file image by the recipient.

As applied to digital cameras, the object is to provide a digital signature for an image file as it emerges in digital form from a digital camera system 10 for later authentication as required. To accomplish this, the digital camera 11 produces from a contained processor 12 two output files for each captured image as shown in FIG. 3a: the first is an all digital, industry standard format image file representing the captured image. The second would be an encrypted digital signature of the image file produced as shown in FIG. 3b by using the camera's unique private key (embedded within the digital camera's secure microprocessor 12b) to encrypt a hash of the captured image file (produced by hashing microprocessor 12a) for creating an encrypted image hash, thus producing a digital signature which, like the image file, is recorded in a recorder 12c of the digital camera system 10, or transmitted directly to a digital processor's memory for later authenticating and viewing the captured image. It is the responsibility of the user to keep track of the image and digital signature files once they leave the camera 10 since both are required to authenticate the image file.

Figure 3C:
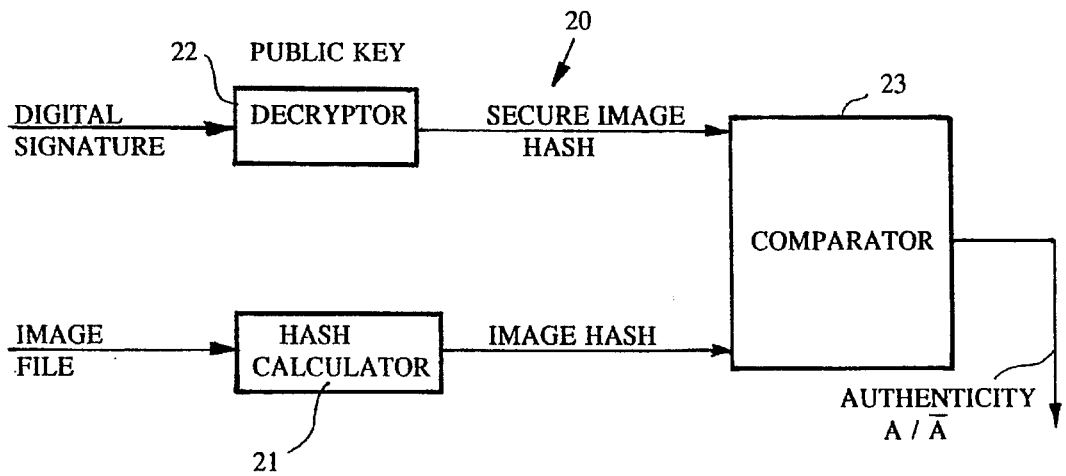

Once the digital image file and the digital signature are generated and stored on a medium in the camera system and/or transferred into a digital processor memory for processing, the image file's authenticity can be checked at any time thereafter by a decrypting authentication system 20 shown in FIG. 3c using a public key taken from the camera name plate or the image's border. The public key can be freely distributed to users for authentication of image files using the authentication system 20. This authentication system 20 has neither the public nor the private key stored. It requires as inputs the digital image file in question, its accompanying digital signature file, and the public key which is unique to the camera believed to have originated the image and digital signature files. It is perfectly reasonable to use as the public key the camera's serial number appearing on the camera's name plate which is used by the manufacturer to identify the camera for such purposes as warranty repair or replacement. The public key is mathematically related to the private key embedded in the secure microprocessor 12b of the digital camera 10 to permit decrypting the digital signature with the public key in the conventional way of encryption and decryption using public and private keys. For image authentication, the image file is hashed for comparison, with the secure image hash obtained by decrypting the digital signature that was encrypted with a private key using the public key. If there are no bit mismatches between the secure image hash and the image hash of the image file, authenticity is confirmed, as will now be described in more detail.

The authentication system 20 calculates its own image file hash using a hash calculator 21 comprising a digital processing system programmed with the same hashing algorithm used in the digital camera (which need not be kept a secret) and a secure image hash using a decryptor 22 comprising a digital processing system with the public key as a second input to decrypt the digital signature. That then reveals the hash originally calculated by the digital camera processor 12 at the time the image was taken. Note that both the hash calculator 21 and the decryptor 22 may be implemented in the same digital processing system 20. A comparator 23 receives the image hash from the hash calculator 21 and the secure image hash from the decryptor 22. If these two hashes match, it is certain to any required degree that the digital image in question is indeed identical to what the digital camera system 10 originally produced. If, on the other hand, even one single bit in the image being authenticated has been altered, the two hashes will not even closely match and the image's authenticity will be indicated as not being affirmed by an authenticity output signal Ā; otherwise the comparator will indicate authenticity by an output signal A.

If the technique is to be effective (i.e., no false positives or false negatives) and extended to larger data sets such as digital video, or even digital holograms, reliance must be made upon the digital memory file systems of the computer mass storage industry, which has already achieved the ability to store and deliver extremely large binary data sets without errors. On the other hand, analog techniques such as the NTSC encoding on video tape formats are not sufficiently reliable for the present invention. Noncorrected digital formats, such as the popular compact disc (CD), are also not sufficiently reliable. In fact CD recording is so unreliable that CD player manufacturers now utilize special techniques, such as "oversampling" to combat the problem of missed bits. Such techniques introduce a large number of errors upon playback which are normally imperceptible and therefore unsuitable for the purposes of image authentication in accordance with this invention. Consequently, the present invention is directed to extremely reliable digital recording systems of all kinds.

Measures of Protection

The invention as described above is resistant to forgery attempts since the private key (which is not known to anybody except the manufacturer of the camera) is embedded in a probe-proof microprocessor which itself is deeply integrated into the camera's digital system. Even if some adept person were to disassemble the camera and replace the microprocessor chip with one containing a different key, the digital signature produced thereafter would not be decryptable by any public key published by the manufacturer since the private key must be mathematically related to the public key in the conventional way of public key cryptography, and the only private key that is properly related to the public key could not feasibly be derived from the public key.

The advantages of freely distributing the verification algorithm and valid public keys are great; with the algorithm freely available, verification can become commonplace and routine. No special certification authority need be involved in routine authenticity checks and no angst among the parties involved need be created as a result of image file authenticity being challenged. But the mass distribution of the verification algorithm does carry one danger: it would be possible for someone to create a bogus program which looks, behaves, and has the same file length as the genuine verification algorithm with the only difference being it always proclaims a "hash match" regardless of the authenticity of the image being verified. With the algorithm freely and widely available, this is not a large risk as additional copies of the verification algorithm can be easily obtained from multiple sources and a more reliable authenticity check made using a best two-out-of-three scheme. Alternatively, as a precaution, a digital signature and an image file known to have an altered image may be used to authenticate the algorithm of the authenticator to be used to determine whether or not it has been created to always proclaim a "hash match." When the stakes are high and it is extremely important that the authentication algorithm be known to be genuine, an independent certification authority or the manufacturer of the digital camera could be called upon to provide a copy of their own algorithm and the public key from their list of public keys (camera serial numbers) at the time of authentication.

The algorithm and private key necessary for encrypting the digital signature file from within the digital camera are to be embedded inside a new class of secure microprocessors whose ROM contents cannot be read once the recording system leaves the factory. Because the private key used for encryption is hard-coded into the microprocessor chip by the manufacturer (who must then ensure the private key remains secret), credibility of the recording system's output becomes an extension of that of the manufacturer; the digital signature from the digital camera can be considered to be just as reliable and secure as if the signature had been generated by the manufacturer.

Each digital camera should possess its own unique pair of private and public keys, with the private key etched into the system's secure microprocessor and the public key stored in three places: in a public key list kept by the manufacturer, on the digital camera's name plate itself (which can then also double as the camera's serial number), and in a border as shown in FIG. 4 which contains more data about the captured image as will be discussed in more detail below.

Assigning unique keys to each camera has the benefit of avoiding instant obsolescence which would occur if only one private key were used for all cameras, and that key were to be compromised. An even higher level of security would occur if the manufacturer were to destroy all records of each private key as the cameras are manufactured, since at that point the private key is no longer needed by the manufacturer; only the record of public keys are retained, which could be the same as the assigned serial number as noted above. This would eliminate the possibility of private keys being compromised by industrial espionage or theft.

Finally, regular and free distribution of all valid public keys is desirable to defeat a counterfeiter who has learned of the encryption algorithm employed and has written a program to produce digital signatures based on fictitious private key. Decoding these digital signatures would require the use of a public key not generated by the manufacturer and thus expose them as forgeries at the outset. Freely distributing updated public key lists would make it easy to identify and thwart such attempts. In fact, it is recommended that the public key of the camera be recorded on the border of the image file for use as the public key in the decryptor 22 since alteration of that public key in the image file to be authenticated would result in the declaration by the comparator 23 of a mismatch between the secure image hash from the decryptor 22 and the hash of the image file from the hash calculator 21.

Uses of the Invention

The single most obvious use of the present invention in digital cameras would be in situations where proof of image authenticity is necessary; such as for legal evidence, insurance claims, or intelligence gathering. The inevitable transition to digital cameras and electronically-transmitted images will also make it more difficult for the photographer to protect his image copyright, since electronic images tend to proliferate faster and with less control from the author than the traditional distribution method which places image control in the hands of whoever holds the original negative or transparency. Just as it is common practice today to obtain releases from photographed persons for any published picture containing a recognizable image of the person, it is reasonable that in the future no electronic image will be published without first having authenticated the image using the digital signature of the camera which is registered with the photographer in order to thwart claims that photographs published have been altered and to improve the trustworthiness of all publications and to uphold copyright claims.

This technique need not be limited to still digital images. Because digital signatures can be used to verify any block of digital data in an image file, it can also be implemented in digital video cameras as noted hereinbefore. In all of these devices, a digital signature can be generated and recorded each time the recording process stops or pauses, or after each block of data; each video "take" is hashed, encoded and written at the time it is recorded, or in the case of continuous recording by a digital, video recorder at the time each block is completed by using the technique of multiplexing between a set of three sets of buffers; as one buffer is filled with a block of data, another block of data in a second buffer is hashed and encrypted and a third block of data is recorded in a third buffer at a faster clock rate so that its algorithms are complete in the second buffer in time to transfer the digital signature in a third buffer to a camera bulk storage medium before a multiplexer shifts functions among the set of three buffers for the next block of data. Thus, with a set of three buffers A, B and C, assume A is receiving an image block, B is hashing and encrypting a previous block, and C is transferring an encrypted block into the camera bulk storage medium. During the next block interval, the functions are switched A to B, B to C and C to A, and during the third block interval the functions are again switched B to C, C to A, and A to B. The following block interval commences a new multiplexing cycle. In that manner, real-time recording in the camera bulk storage medium is delayed by only three block intervals.

A Special Border

In the case of the digital camera equipped with the present invention being targeted towards legal authentication, a few additional features can be implemented to better serve this use. A brightly colored border could automatically be generated as part of each captured image file. Within the border would appear (as shown in FIG. 4) textual information about the image: the camera public key, the date and time it was taken, the ambient light level seen by the camera at the time of exposure, the original color temperature of the scene, the software version of the camera's firmware, f/stop and shutter speed (or the CCD equivalent "sample time"), the focusing distance of the lens at the time of exposure, the distance (range) of prominent objects in the scene being imaged using a range finder 13, such as an acoustic, infrared or laser range finder or other range finders such as multiple-object optical range finding or contrast detection range finding systems, a unique image sequence number and, when the technology allows for a Global Positioning System (GPS) receiver to be built into the camera, the geographical coordinates of the camera indicating where in the world the picture was taken.

The present invention as it applies to authentication of camera photographs as described with reference to FIGS. 3a, 3b, 3c and 4 completely mitigates the new threats of computer-assisted alteration of digital image files and eliminates the threat of deception by attaching or substituting false captions or other information recorded in the border as shown in FIG. 4. Such information helps an investigator identify and interpret information by what is depicted in the photographs.

One piece of information captured in the border of the photographs is a record of the distance at which the lens was focused. A second piece of information captured in the border that may be useful in interpretation of the photograph in a more sophisticated way is range information of prominent objects in the scene at the time the picture was taken using the range finder 13, such as an acoustic range finder, or an infrared or laser range finder. Optical range finders could also be used. In an acoustic range finder, the acoustic module (sometimes referred to as an "ultrasonic transducer" operates at frequencies selected beyond the range of human hearing, and often pulses of multiple frequencies may be used to guard against the absorption of a single frequency by a particular object. Once the timing of the return echo has been obtained, the distance can be determined by employing the formula d=(1,100 t)2 where the distance of the object d is in feet and the t is the number of seconds. For example, if the echo returns in 9 milliseconds, the distance of an object would be recorded as 5 feet. Listening for multiple echoes could allow for recording the distance of several prominent objects in the field of view (typically at least three). Less prominent objects could return echoes of lesser energy, but prominent objects should be selected by adjustment of a threshold selection amplifier. Range information recorded in the image border not only makes digital manipulation of the photograph in a computer more difficult without the manipulated photograph being declared not authentic by the comparator 23, but also aids one viewing and analyzing the scene with some perspective of the two-dimensional photograph of a three-dimensional scene, such that the depths of all other objects may be estimated by the relative positions of the prominent objects the range of which are determined and recorded.

The range information also thwarts attempts to make a duplicate "original" image file which has been manipulated by projecting at lifesize proportions the manipulated image file and photographing it with the same camera as was used to record the truly original image file at a distance similar to what the image's content would suggest. Such a manipulated duplicate "original" would be readily declared to be not authentic since all ranges recorded for the objects in the image would be virtually the same as the range recorded for objects at or near the center of the projected image instead of the true original ranges recorded in the truly original image file.

The lens' focused distance and f/stop are there to help detect potential abuse of the camera, such as taking a close-up picture of a modified photograph and trying to pass it off as an unaltered original. The ambient light level and color temperature readings would be useful for getting a feel for exactly what the scene was like at the time of exposure; something a sensitive optical element might inadvertently hide via automatic exposure and color correction.

Since all the textual data in the image file border are part of the authenticated image file, their credibility are also upheld when authenticated by the authentication process. The accuracy of the date and time information would again be the responsibility of the secure microprocessor; in addition to being able to keep its algorithm and private key a secret, it also could have a lithium battery powering a system clock set to Universal (Greenwich Mean) Time at the time of manufacture. If the timer should ever fail or is tampered with, the system would be programmed to fill the time and date fields with XXXX's, eliminating the chance of an erroneous random time being indicated for the actual time.

Higher Level of Security

Although the present invention offers a satisfactory level of security, nevertheless there still exists a small possibility that a determined person may be able to discover the camera's private key given an extended amount of time. (No cryptographic scheme will protect data forever; given sufficient time, advancements in code breaking or improved computer power may some day be enough to render any existing level of cryptographic protection obsolete.) If the discovered private key were to be available to the custodian of the camera image files, it would allow the custodian of the image files from that camera to generate authentic-looking digital signatures on altered image files, essentially undermining the credibility offered by the compromised camera. However, the security level of other cameras in use, and of images taken with those other cameras will remain uncompromised.

It would be wise for a manufacturer of such digital cameras to regularly upgrade and enhance the sophistication of the encryption implementation as newer camera models are introduced, typically those using longer encryption/decryption key lengths and improved encryption/decryption and hash algorithms. It is expected that evolving authentication algorithms (the public domain component of this authentication invention which is to be freely distributed) will be designed to be compatible with earlier versions, i.e., to recognize, identify and authenticate image files made with all previous digital camera models equipped with a microprocessor for hash calculation and a secure microprocessor for encryption with a private key.

Because the encryption details must necessarily be changed often (depending on the technological capabilities of the day), no single image format, key length encryption, or hashing algorithm is being specified. Instead, reference is made to the National Institute of Standards and Technology's (NIST) proposed Digital Signature Standard (DSS) as an example for implementation of the present invention. [Dennis K. Branstad, *"The Proposal for a U.S. Standard for Digital Signature Encoding,"* IEEE Spectrum, pp. 30, August 1992]

A specific application of the present invention is directed toward the solution of an ever more troubling social problem, namely the eroding credibility of photographic images, but its many other applications where image files are to be stored, transmitted and/or transformed to visual form may also benefit from it.

Although particular embodiments of the invention have been described and illustrated herein, it is recognized that modifications may readily occur to those skilled in the art. Consequently, it is intended that the claims be interpreted to cover such modifications and equivalents thereof.

I claim:

1. A digital camera with apparatus for authentication of images produced from an image file taken by said digital camera of a scene, said digital camera having embedded therein a private key unique to said digital camera and a known public key so uniquely based upon said private key that digital data encrypted with said private key may be decrypted using said public key, said digital camera apparatus comprising first means for calculating image hash of said image file using a predetermined algorithm, second means for encrypting said image hash with said embedded private key, thereby producing a digital signature uniquely associated with said image file, and third means for maintaining association of both said image file and said digital signature derived from said image file by said first and second means.

2. A combination as defined in claim 1 including separate apparatus for authenticating at any time said image file as being free of any alteration using said associated digital signature, said separate apparatus comprising fourth means for decrypting said digital signature, using said public key, thereby deriving a secure image hash identical to said image hash produced by said first means of said digital camera apparatus by calculating image hash of said image file from said digital camera, fifth means for calculating image hash of said image file that has been maintained in association with said digital signature, said fifth means using said predetermined algorithm, and sixth means for comparing said image hash of said image file calculated by said fifth means with said secure image hash from said fourth means to determine authenticity of said image file that has been maintained in association with said digital signature for use of said image file in reproducing an image represented by said image file if both said image file and said secure image file match identically.

3. A combination as defined in claim 1 wherein said private key is embedded in said second means.

4. A combination as defined in claim 3 wherein said public key is published.

5. A combination as defined in claim 4 wherein said public key is published on said digital camera.

6. A combination as defined in claim 4 wherein said public key is digitally recorded in a border of said image file and is processed through hashing and encryption with said image file.

7. A combination as defined in claim 6 wherein further information is digitally recorded in said border regarding parameters of said digital camera extant at the time said image file is taken and is processed through hashing and encryption with said image file to assist in reproduction and interpretation of a reproduced image of said scene.

8. A combination as defined in claim 1 wherein focusing distance is digitally recorded in a border of said image file and is processed through hashing and encryption with said image file.

9. A combination as defined in claim 1 wherein range from said digital camera to one or more prominent objects in said scene are recorded in a border of said image file and is processed through hashing and encryption with said image file.

* * * * *